United States Patent

Kamel et al.

(10) Patent No.: US 7,583,750 B2
(45) Date of Patent: Sep. 1, 2009

(54) METHOD OF DATA BURST TRANSMISSION

(75) Inventors: Raafat E Kamel, Little Falls, NJ (US);
Tejaskumar R. Patel, Randolph, NJ (US);
Stanley Vitebsky, Morristown, NJ (US);
Diane Colby Wolchik, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 794 days.

(21) Appl. No.: 10/789,086

(22) Filed: Feb. 27, 2004

(65) Prior Publication Data

US 2005/0190852 A1    Sep. 1, 2005

(51) Int. Cl.
*H04L 27/00* (2006.01)

(52) U.S. Cl. .............. 375/295; 370/290; 370/252

(58) Field of Classification Search ......... 375/259–260, 375/295; 455/522; 370/209, 230, 252, 318
See application file for complete search history.

(56) References Cited

U.S. PATENT DOCUMENTS

| | | | |
|---|---|---|---|
| 5,946,356 A * | 8/1999 | Felix et al. ............... 375/295 |
| 6,760,576 B2 * | 7/2004 | Chen ........................ 455/266 |
| 6,930,981 B2 * | 8/2005 | Gopalakrishnan et al. ... 370/252 |
| 6,981,184 B2 * | 12/2005 | Morgan et al. ............. 714/704 |
| 7,039,002 B2 * | 5/2006 | Heo et al. .................. 370/208 |
| 7,272,110 B2 * | 9/2007 | Lee et al. ................... 370/209 |
| 2003/0035367 A1 * | 2/2003 | Heo et al. .................. 370/209 |
| 2003/0063588 A1 * | 4/2003 | Lee et al. ................... 370/335 |
| 2003/0208715 A1 * | 11/2003 | Morgan et al. ............. 714/776 |
| 2003/0231586 A1 * | 12/2003 | Chheda ..................... 370/230 |
| 2004/0179525 A1 * | 9/2004 | Balasubramanian et al. 370/391 |
| 2004/0192315 A1 * | 9/2004 | Li et al. .................... 455/447 |
| 2004/0253955 A1 * | 12/2004 | Love et al. ................. 455/442 |
| 2005/0107107 A1 * | 5/2005 | Shahidi et al. ............. 455/522 |

* cited by examiner

*Primary Examiner*—Jean B Corrielus
(74) *Attorney, Agent, or Firm*—John Ligon; Ozer Teitelbaum

(57) ABSTRACT

A method of communicating at least one data burst using an assigned radio configuration. The assigned radio configuration is chosen from one of at least two radio configurations by examining which radio configuration supports a higher data transmission rate. This examination is determined by calculating the data transmission rate for the data burst(s) base on a power level and Walsh code for each of the radio configurations.

9 Claims, 1 Drawing Sheet

METHOD OF DATA BURST TRANSMISSION

BACKGROUND OF THE INVENTION

I. Field of the Invention

The present invention relates to telecommunications, and more particularly, to wireless communications.

II. Description of the Related Art

Wireless communications systems provide wireless service to a number of wireless or mobile units situated within a geographic region. The geographic region supported by a wireless communications system is divided into spatially distinct areas commonly referred to as "cells." Each cell, ideally, may be represented by a hexagon in a honeycomb pattern. In practice, however, each cell may have an irregular shape, depending on various factors including the topography of the terrain surrounding the cell. Moreover, each cell can be further broken into two or more sectors. Each cell is commonly divided into three sectors, each having an angular span of 120 degrees.

A conventional cellular system comprises a number of cell sites or base stations geographically distributed to support the transmission and reception of communication signals to and from the wireless or mobile units. Each cell site handles voice communications within a cell. Moreover, the overall coverage area for the cellular system may be defined by the union of cells for all of the cell sites, where the coverage areas for nearby cell sites overlap to ensure, where possible, contiguous communication coverage within the outer boundaries of the system's coverage area.

Each base station comprises at least one radio and at least one antenna for communicating with the wireless units in that cell. Moreover, each base station also comprises transmission equipment for communicating with a Mobile Switching Center (MSC). A mobile switching center is responsible for, among other things, establishing and maintaining calls between the wireless units, between a wireless unit and a wireline unit through a public switched telephone network (PSTN), as well as between a wireless unit and a packet data network (PDN), such as the Internet. A base station controller (BSC) administers the radio resources for one or more base stations and relays this information to the MSC.

When active, a wireless unit receives signals from at least one base station or cell site over a forward link or downlink and transmits signals to at least one cell site or base station over a reverse link or uplink. There are many different schemes for defining wireless links or channels for a cellular communication system. These schemes include, for example, TDMA (time-division multiple access), FDMA (frequency-division multiple access), and CDMA (code-division multiple access) schemes.

In a CDMA scheme, each wireless channel is distinguished by a distinct channelization code (e.g., spreading code, spread spectrum code or Walsh code) that is used to encode different information streams. These information streams may then be modulated at one or more different carrier frequencies for simultaneous transmission. A receiver may recover a particular stream from a received signal using the appropriate Walsh code to decode the received signal.

Each base station using a spread spectrum scheme, such as CDMA, offers a number of Walsh codes, and consequently, can serve a corresponding number of users, within each sector of a cell. In the CDMA 2000 3G-1X system, for example, the number of Walsh codes made available by each sector for voice may be defined by the radio configuration ("RC") employed by the base station. The maximum number of Walsh codes available for an RC3 assignment is 64, while RC4 assignment, in contrast, supports a maximum of 128 Walsh codes. Under certain conditions, such as when the majority of users are in benign RF environment, the users are concentrated in the area near antenna or majority of the users are stationary, etc., the RF capacity of CDMA 2000 3G-1X may exceed the Walsh code capability of RC3 (radio configuration 3) assignment. An RC3 assignment may be expected to be exceeded when technologies, such as transmit diversity, an intelligent antenna(s), and/or a selectable mode vocoder(s) are introduced.

The number of Walsh codes made available by a base station may take into consideration variables including the transmit power requirements associated with the selected radio configuration. For example, an RC4 assignment typically requires a relatively longer spreading code and may have a greater transmit power requirement than an RC3 assignment, which is a relatively shorter spreading code. Consequently, a tradeoff exists between the power efficiency of the base station based on the RC configuration employed and the length/number of spreading codes made available within each sector of a cell. An RC4 assignment, for example, may degrade capacity by supporting a weaker coding rate than an RC3 assignment.

With the explosion of the Internet and the increasing demand for data, resource management has become a growing issue in cellular communication systems. Next generation wireless communication systems are expected to provide high speed data services in support of Internet access and multimedia communication. Unlike voice, however, data communications may be relatively delay tolerant and potentially bursty. Data communications, as such, may not require dedicated links on the downlink or the uplink, as is the case with voice communication through the use of the fundamental channel, but rather enable one or more supplemental channels for a short duration using resources that could be shared by a number of wireless units. By this arrangement, each of the wireless units competes for available resources. The resources to be managed on the downlink include transmit power and Walsh codes.

As data communications are typically shorter in time duration than voice communication, next generation wireless communication systems are expected to use channel bursts to maximize data transfer. Unlike voice channels, however, these channel bursts—commonly referred to as data bursts—are designed for the supplemental channel. A data burst, for the purposes of the present disclosure, may correspond with the sending of a signaling message(s) over a fundamental channel specifying the length of time and data rate at a particular radio configuration in which a supplemental channel may be set up for such data transmission. Consequently, data bursts rely on the availability of a supplemental channel. The supplemental channel, however, may use more sector resources, such as power and Walsh codes, than the fundamental channel. As such, the supplemental channel may take a lower priority in support of data communication, in comparison with the fundamental channel in support of voice communication.

In view of the above considerations, a method is needed for assigning Walsh codes and power to the supplemental channel in support of the use of a data burst(s). Since different Radio Configurations specified in the standard allow for trading off power and Walsh code resources, a method is also needed for an optimal selection of Radio Configurations in support of a data burst(s).

SUMMARY OF THE INVENTION

The present invention provides a method of communicating one or more data bursts over the supplemental channel, for example. The term communicating here corresponds with the transmission and reception of data bursts. More particularly, the present invention provides a method of assigning one of at least two radio configurations to the data burst(s) to thereby change the number of designated spread spectrum (e.g., Walsh) codes. The assignment of a radio configuration ("RC") may be realized by examining which of the radio configurations support a higher data transmission rate for the burst. This examination may be determined by calculating the data transmission rate for the data burst(s) based on one or more variables, such as, for example, a power level and Walsh code for each of the at least two radio configurations. This examination may be performed in accordance with the average metric(s) of the system, as well as the projected state of the system at the time of the data burst.

In one embodiment, a method of the present invention assigns an RC to a data burst by evaluating what the instantaneous power level might be at the onset of a data burst for each RC. The method may also include the step of evaluating the availability of Walsh codes for each RC. Thereafter, the data transmission rate may be calculated for each RC and the data burst may be assigned the RC that offers the higher calculated transmission rate.

In another embodiment, a method of the present invention assigns an RC to a data burst if the calculated transmission rates for each RC are about the same. Here, a channel power may be compared with a threshold. If the channel power is at or below the threshold, the RC with the higher number of maximum traffic Walsh codes may be assigned. In the alternative, if the channel power is above the threshold, a power utilization and a Walsh code utilization may be computed and compared. Thereafter, the method may then assign to the data burst the RC that minimizes the usage of the resource (power or Walsh code), which is more utilized in view of the step of comparing the computed power and Walsh code utilizations.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

In CDMA 2000 systems, for example, Walsh codes (e.g., spreading codes or spread spectrum codes or orthogonal codes) are used for forward channelization. Specifically, an RC3 assignment may support up to a maximum of 64 spreading codes, while an RC4 assignment may support up to a maximum of 128 spreading codes. Consequently, any RC3-based spreading code may produce two (2) RC4-based spreading codes, which can coexist on the same carrier with RC3-based spreading codes. RC3-based spreading codes, however, are more efficient than RC4-based spreading codes in terms of power required to transmit using each code. Consequently, wireless communication systems may perform a tradeoff analysis between the transmit power requirements of assigning a radio configuration and the availability of channelization codes.

The present invention provides a method of communicating one or more data bursts over the supplemental channel, for example. More particularly, the present invention provides a method of assigning one of at least two radio configurations to the data burst(s) to thereby change the number of designated spread spectrum (e.g., Walsh) codes. The assignment of a radio configuration may be realized by examining which of the radio configurations support a higher data transmission rate for the burst. This examination may be determined by calculating the data transmission rate for the data burst(s) based on one or more variables, such as, for example, a power level and Walsh code for each of the at least two radio configurations. This examination may be performed in accordance with the average metric(s) of the system, as well as the projected state of the system at the time of the data burst.

Figure 1:
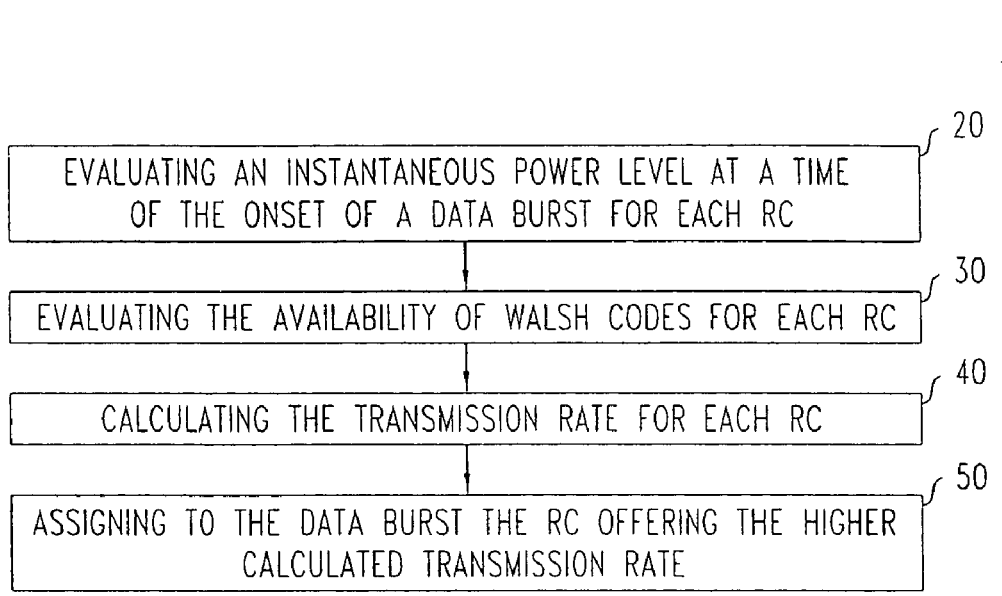
FIG. 1 depicts a flow chart of an embodiment of the present invention.

Referring to FIG. 1, a flow chart depicting one embodiment of the present invention is illustrated. More particularly, an algorithmic method (10) is shown for assigning an RC from at least two differing radio configurations for a data burst. Prior to communicating the data burst, a call may be set up over the uplink and downlink. Once the call is established, the contents relevant to the data communications may be received so that a data burst might be scheduled.

Thereafter, algorithmic method (10) examines each radio configuration under consideration for use with the data burst. This examination is based on a number of variables in the transmission of the data burst. The examination of these variables may take into consideration average metric(s) of the system, as well as the projected state of the system at the time of the data burst.

The examination of each radio configuration may include a number of steps. Algorithmic method (10) may, for example, evaluate a power level of the transmitter (step 20). This power level includes the power in use by the transmitter for each RC under consideration without the data burst. Moreover, this power level also includes the projected power needed by the transmitter at the onset of the data burst for each RC. Similarly, algorithmic method (10) may also evaluate the availability of Walsh codes for each radio configuration (step 30). For example, algorithmic method (10) may examine the available number of Walsh codes for RC3. This result may be compared along with the available number of Walsh codes for RC4.

Once the transmitter has been examined, and the power level and available Walsh codes evaluated for each RC, algorithmic method (10) thereafter calculates a transmission rate (step 40). This calculated step is performed for each radio configuration under consideration based on the evaluated power levels and available Walsh codes. Consequently, the algorithmic method (10) compares the results of the calculated step for each RC and may determine that one of the considered radio configurations should offer a higher transmission rate. Therefrom, the algorithmic method (10) subsequently may assign to the data burst(s) the radio configuration offering the higher calculated transmission rate (step 50). Once assigned an RC, the data burst may be transmitted and received over the supplemental channel.

Figure 2:
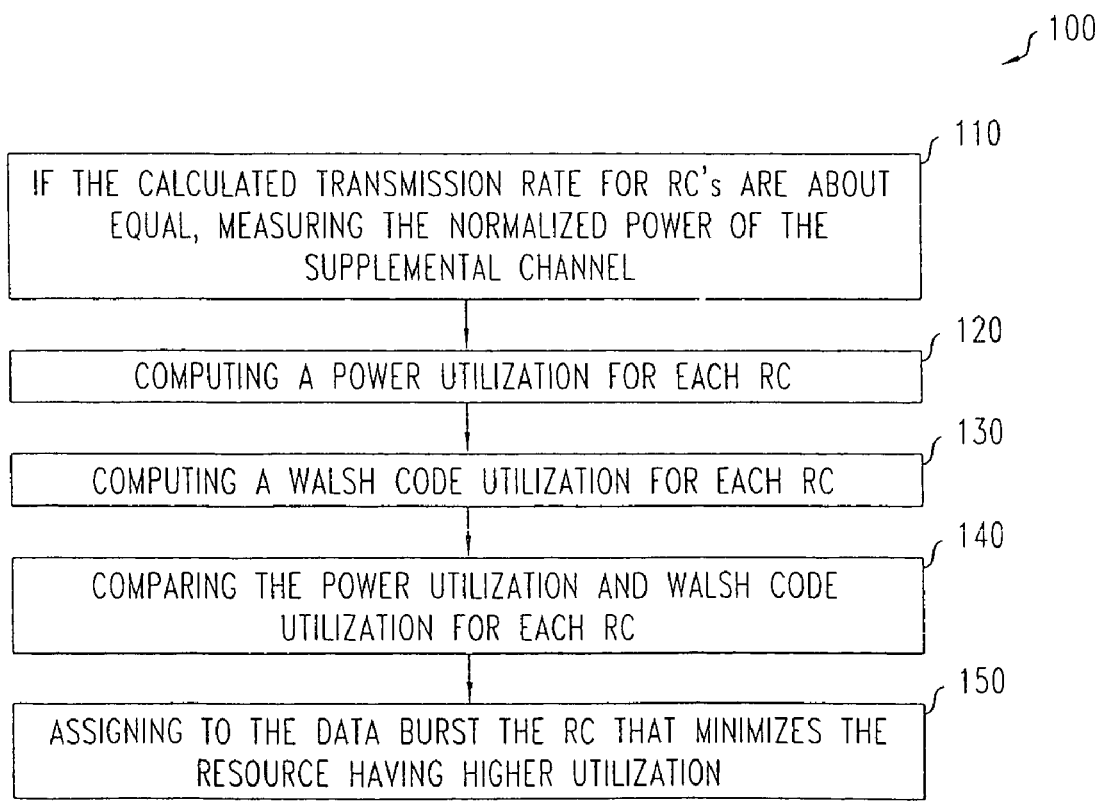
FIG. 2 depicts a flow chart of another embodiment of the present invention.

Referring to FIG. 2, a flow chart depicting one embodiment of the present invention is illustrated. Here, an algorithmic method (100) is shown for assigning an RC from at least two differing radio configurations for a data burst. More particularly, algorithmic method (100) addresses the circumstance where, upon comparing the transmission rates for each radio configuration under consideration, it is concluded that they are about equal to each other.

In furtherance of algorithmic method (100), the normalized power for the supplemental channel is measured (step 110). This normalization may be performed to eliminate power dependence on the supplemental channel data rate. This approach may be realized by measuring the power in the fundamental channel. In this case, the measured fundamental channel power may be adjusted by the appropriate factors to account for the different power requirements in the circumstance where the fundamental channel and the supplemental channel are transmitted over a different soft handoff active set using different radio configurations.

If the measured normalized power is less than or equal to a designated fundamental gate threshold, the radio configuration with the larger number of Walsh codes (e.g., RC4) may be assigned. In so doing, the assignment of RC4 favors users requiring less power. For example, users in close proximity to the serving base station may require less power.

In the alternative, the measured normalized power is greater than the fundamental gate threshold, algorithmic method (100) includes the step of computing the utilization of power (step 120). This power utilization step may be derived for each radio configuration under consideration. In one example, the power utilization for each RC may be calculated by dividing the total power in use during the data burst by the maximum base station transmission power.

With the power utilization computed for each radio configuration, the algorithmic method (100) may also include the step of computing the utilization of Walsh codes (step 130). The Walsh code utilization may be derived for each radio configuration under consideration and may correspond a normalized measurement for each radio configuration. In one example, the Walsh code utilization for each RC may be calculated by dividing the Walsh codes in use during the data burst by the maximum number of Walsh codes. It should be noted that in this example, Walsh code blocking between the codes of different length might be taken into consideration, according to the Walsh code orthogonality rules.

The calculation of utilization of Walsh codes may be performed in terms of Walsh codes of either radio configuration. For example, if the calculation is performed in terms of RC4 Walsh codes, then each RC3 code may be counted as two codes and each RC4 code as a singular Walsh code. Alternatively, if the calculation is performed in terms of RC3 codes, each RC4 code may be counted as ½ and each RC3 code as one Walsh code. When an RC3 burst is considered in the presence of other users that are assigned RC4 codes, the calculation may take into account the blocking of RC3 codes by a non-orthogonal RC4 code belonging to the same branch of the Walsh tree.

In one example of algorithmic method (100), the power utilization and Walsh code utilization are compared for each radio configuration under consideration (step 140). This comparison step may include dividing the computed power utilization by the computed Walsh code utilization for each radio configuration. It should be noted that the power and Walsh code utilizations are the projected values after assigning the burst using either RC3 or RC4.

Thereafter, the data may be assigned a radio configuration that minimizes the resource having higher utilization (step 150). This determination may be derived solely by assessing which radio configuration has the lower ratio of utilization from dividing the computed power utilization by the computed Walsh code utilization. In one example, a radio configuration is selected for which the power to Walsh utilization ratio is the closest to 1, or, alternatively, a tunable value close to 1.

In an alternative example related to the case when the final rates for each radio configuration were determined to be about the same, if the power resources were evaluated before Walsh code resources sequentially, and if the power Resource Manger returned different transmission rates for RC3 and for RC4, then algorithmic method (100) may assign RC4. Here, RC4 may be assigned because the Walsh code Resource Manager may have downgraded the transmission rate due to the availability of Walsh codes. If the power Resource Manager returns the same transmission rate for both RC3 and RC4, algorithmic method (100) may assign RC3. RC3 may be assigned in this scenario because the availability of Walsh codes appears to be not a problem.

It should also be noted that while embodiments detailed herein address assigning a number of spreading codes, such as Walsh code, by a base station, the present invention is also applicable to quasi-orthogonal Walsh functions, as well as modified Walsh codes and UMTS orthogonal variable spreading factor codes ("OVSF").

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method for use in wireless communication comprising:

assigning one of at least two radio configurations, the radio configuration being assigned as a function of a higher data transmission rate determined by calculating the data transmission rate for at least one data burst by evaluating the power level for each radio configuration and evaluating the availability of Walsh codes for each radio configuration, the assigning, calculating and evaluating being carried out by a node in a wireless communication network;

transmitting the at least one data burst using said assigned radio configuration;

wherein evaluating the power level for each radio configuration comprises:

evaluating the power level without the at least one data burst; and evaluating the power level for the at least one data burst.

2. The method of claim 1, wherein the evaluated power level for the at least one data burst comprises:

evaluating the power level at an onset of the at least one data burst.

3. The method of claim 2, comprising if the calculated data transmission rate is about equal for each radio configuration, comparing a channel power with a threshold.

4. The method of claim 3, comprising:

if the channel power is at or below the threshold, assigning the one of the radio configurations with a higher of maximum number of traffic Walsh codes of said at least two radio configurations; and if the channel power is above the threshold, computing a power utilization and Walsh code utilization for each radio configuration.

5. The method of claim 4, wherein computing a power utilization for each radio configuration comprises:

for each radio configuration, dividing the power in use during the at least one data burst by a maximum traffic transmission power.

6. The method of claim 4, wherein computing a Walsh code utilization for each radio configuration comprises:

for each radio configuration, dividing the Walsh codes in use during the at least one data burst by a maximum number of traffic Walsh codes.

7. The method of claim 6, wherein dividing the Walsh codes in use comprises:

considering Walsh code blocking between codes of different length in response to available Walsh code orthogonality.

8. The method of claim 4, comprising:

assigning the radio configuration having a ratio of power utilization to Walsh utilization closest to at least one of unity and a tunable value about unity.

9. The method of claim 4, wherein the at least two radio configurations comprises at least one of Radio Configuration 3 (RC3) and Radio Configuration 4 (RC4).

* * * * *

UNITED STATES PATENT AND TRADEMARK OFFICE
CERTIFICATE OF CORRECTION

PATENT NO. : 7,583,750 B2 Page 1 of 1
APPLICATION NO. : 10/789086
DATED : September 1, 2009
INVENTOR(S) : Kamel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1465 days.

Signed and Sealed this

Fourteenth Day of September, 2010

David J. Kappos
*Director of the United States Patent and Trademark Office*